United States Patent Office 2,920,076
Patented Jan. 5, 1960

2,920,076

PREPARATION OF 2,5-DIMETHYLPIPERAZINE

George W. Fowler, Donald G. Crosby, and William R. Proops, South Charleston, W. Va., assignors to Union Carbide Corporation, a corporation of New York No Drawing. Application February 9, 1956
Serial No. 564,359

9 Claims. (Cl. 260—268)

This invention relates to the manufacture of trans-2,5-dimethylpiperazine and more particularly to a novel method of making 2,5-dimethylpiperazine to obtain a relatively high yield of the trans- form of this compound. Dimethylpiperazines are useful monomers in the synthesis of a variety of polymeric products. These compounds are in effect difunctional secondary amines and are reactive with dicarboxylic acids to form polyamide resins and with diisocyanates to form polyurethans. Also dimethylpiperazines may be used as starting materials in the preparation of various pharmaceutical products. The preferred starting material for most of these syntheses is trans-2,5-dimethylpiperazine and it is important that this starting compound be substantially free from both stereo and chemical isomers thereof since an impure monomer leads to the production of an inferior polymer.

Various methods of preparing 2,5-dimethylpiperazine are known in the art but in general such methods produce both the desired trans- and the undesired cis- forms of this compound and the yield of the trans- form is relatively low. It is accordingly an object of the present invention to provide a method of making trans-2,5-dimethylpiperazine in an improved yield. It is another object of the invention to provide a method of isomerizing cis-2,5-dimethylpiperazine to the trans- form. It is still another object of the invention to provide a method of making 2,5-dimethylpiperazine from 2,5-dimethylpyrazine wherein the isomerization of cis-2,5-dimethylpiperazine to the trans- form can be carried out as a part of the same reaction. Other objects of the invention will be in part obvious and in part pointed out hereafter.

The present invention is based, in part, upon our discovery that cis-2,5-dimethylpiperazine when brought into contact with a suitable catalyst under the conditions outlined below is largely isomerized to the trans- form, and that catalysts which promote this isomerization reaction will also, under substantially the same conditions, catalyze the hydrogenation of 2,5-dimethylpyrazine to 2,5-dimethylpiperazine. We have further found that the cis-2,5-dimethylpiperazine used as a starting material in the isomerization reaction need not be a pure product but may be associated with other products. Thus the present invention makes possible a continuous process wherein 2,5-dimethylpyrazine is hydrogenated to form a mixture of trans- and cis-2,5-dimethylpiperazine, the trans- form of the compound is separated and the cis- form together with the other reaction products is recycled to the same reactor for isomerization to produce further quantities of the trans- compound. In this way a relatively high yield of the desired trans- compound can be achieved.

In one of its broader aspects the present invention comprises a vapor-phase method of converting cis-2,5-dimethylpiperazine to the trans- form. To effect this isomerization cis-2,5-dimethylpiperazine in vapor form is passed over a nickel catalyst at a temperature of 150°–180° C. The feed rate may be varied from say 40 to 600 grams per liter of catalyst per hour, a convenient feed rate being 150 grams per liter per hour. The nickel catalyst used may be prepared in any of various ways as outlined below.

In a somewhat narrower aspect the method of the invention comprises hydrogenating 2,5-dimethylpyrazine in vapor form in the presence of a nickel catalyst to form a reaction product containing both trans- and cis-dimethylpiperazine, separating the trans- dimethylpiperazine from the reaction products, and recycling the remaining reaction products over the nickel catalyst to cause the cis-dimethylpiperazine therein to be isomerized to the transform. Separation of the trans-dimethylpiperazine from the other reaction products can be conveniently effected by filtration since the trans- form of dimethylpiperazine is substantially insoluble in the cis- form at room temperature. This aspect of the invention can be carried out in either a step-wise or a continuous manner. Thus a quantity of a reaction product containing both trans- and cis-dimethylpiperazine can be prepared by passing a mixture of 2,5-dimethylpyrazine and hydrogen over a nickel catalyst at a temperature of 150°–180° C. The dimethylpyrazine feed rate is desirably maintained between 40 and 600 grams per hour per liter of catalyst and the hydrogen feed rate is desirably maintained between 120 and 400 liters per hour per liter of catalyst. The accumulated reaction products are filtered at room temperature to remove transdimethylpiperazine therefrom, and the filtrate is vaporized and fed to the same or a different catalyst bed under conditions similar to those used for the hydrogenation step to cause the cis-dimethylpiperazine in the first step reaction product to be isomerized to the trans- form.

Alternatively, the present method may be carried out in a fully continuous manner. In accordance with this embodiment the reaction products from the catalyst bed are condensed and cooled, the trans-dimethylpiperazine is continuously removed therefrom by filtration, the filtrate is vaporized and mixed with 2,5-dimethylpyrazine, and the resulting mixture is fed to the catalyst bed. The feed rates and operating conditions are similar to those given for the step-wise embodiment described above.

The catalysts used in carrying out the present method are preferably high nickel catalysts containing say 30% to 70% by weight of nickel on a suitable support. They may be prepared either by precipitating nickel on a preformed support or by co-precipitating a nickel salt and a suitable inert material. Among the catalysts that have been found satisfactory are 60% nickel on alumina, 53–54% nickel on Filter-Cel, and 56% nickel on kieselguhr. Other suitable supports for the nickel catalyst include Super Filtrol, Magnesol and silica gel. Promoters such as chromium, cobalt, copper and magnesium may also be used. Especially good results have been obtained with a nickel-alumina catalyst of the type described in the specific example given below.

If the catalyst is not already in a completely reduced state, it is preferably subjected to a preliminary hydrogenation treatment before being used in the present process. This preliminary treatment may comprise heating the catalyst in a hydrogen atmosphere at a temperature of 350° to 400° C. for a period of 6 to 48 hours. This same procedure may be used for reactivating the catalyst when its activity has fallen below a desired value.

The 2,5-dimethylpyrazine used as a starting material in the above-described process may be prepared, for example, by the dehydrogenation, condensation and cyclodehydration of monoisopropanolamine according to the method described in the co-pending application of Benjamin T. Freure, Serial No. 514,123, filed June 8, 1955. It has been found that 2,5-dimethylpyrazine as thus prepared contains small quantities of monoisopropanolamine which tend to impair the activity of the nickel catalyst used in the present process and also to produce undesired impurities in the reaction products. Accordingly, when the 2,5-dimethylpyrazine used as a starting material is prepared by the process of application Serial No. 514,123, it is preferably subjected to a preliminary purification.

To effect this purification, the 2,5-dimethypyrazine containing the monoisopropanolamine may be mixed with about 20% of its weight of a volatile liquid hydrocarbon such as VMP naphtha, nonane, ethylbenzene, diethylbenzene or the like and distilled in a reflux still. The condensed distillate is passed upwardly through a water-filled scrubber to cause the monoisopropanolamine to be washed therefrom, and the washed distillate is returned to the still. Distillation is continued until the weight of the wash water remains constant, thus indicating that substantially all of the monoisopropanolamine has been removed.

The liquid hydrocarbon and dimethylpyrazine are then separated by fractional distillation. If the nature of the liquid hydrocarbon used is such that its boiling point is substantially different from that of the dimethylpyrazine, this separation can be effected without addition of a third component to the mixture. However, if the boiling points of the liquid hydrocarbon and dimethylpyrazine are relatively close together, it is desirable to add a quantity of water to the mixture. The hydrocarbon is then removed as the upper layer of a water-hydrocarbon azeotrope. After disappearance of the hydrocarbon layer, water is removed as the major component of a homogeneous water-2,5-dimethylpyrazine azeotrope. The remainder of the 2,5-dimethylpyrazine is then distilled to give a refined product suitable for use in the present process.

In order to point out more fully the nature of the present invention, the following specific example is given of an illustrative embodiment of the invention: A quantity of 2,5-dimethylpyrazine prepared according to the process of application Serial No. 514,123 referred to above was mixed with about 20% of its weight of VMP naphtha having a boiling point of 110°–120° C. and distilled in a reflux still. The condensed distillate was passed upwardly through a scrubber containing a predetermined quantity of water to dissolve monoisopropanolamine from the distillate, and the naphtha layer was returned to the still. The wash water was replaced by fresh water from time to time and the removed water was weighed to determine its monoisopropanolamine content. Distillation was continued until the increase in weight of the water removed was negligible. Thereafter, the naphtha and 2,5-dimethylpyrazine were separated by fractional distillation. The resulting 2,5-dimethylpyrazine was found to be substantially free from monoisopropanolamine.

The catalyst used in the present example was made in the following manner: A solution was prepared comprising one liter of water, 820 grams of nickel nitrate hexahydrate, 200 grams of aluminum nitrate nonahydrate, 7.64 grams of magnesium nitrate hexahydrate, 1.3 grams of ferric nitrate nonahydrate and 24.1 grams of chromic nitrate nonahydrate. This solution was added to 2790 grams of a vigorously stirred solution of 10% sodium hydroxide. The resulting precipitate was filtered, washed thoroughly with water and dried. The dried material was placed in an oven at 375° C. for four hours, after which it was heated at 375° C. in a stream of hydrogen for a further period of 24 hours, and then cooled.

The catalyst as thus prepared was used for the vapor phase hydrogenation of 2,5-dimethylpyrazine purified as described above. The dimethylpyrazine in vapor form was mixed with hydrogen and passed through the catalyst bed at the rate of 150 grams of dimethylpyrazine and 150 to 200 liters of hydrogen per hour per liter of catalyst. The temperature was maintained at 155°–160° C. and the reaction was continued for a period of 3 days. At the end of this period analysis of the reaction product showed that an average yield of 29% of trans-2,5-dimethylpiperazine had been achieved.

The trans-2,5-dimethylpiperazine was separated by filtration and the filtrate was recycled over the catalyst to cause the cis-2,5-dimethylpiperazine contained therein to be isomerized to the trans-form. Before recycling the filtrate, the catalyst was reactivated by treatment with hydrogen at 370°–380° C. for about 24 hours. The vaporized filtrate was fed to the catalyst bed at a rate of about 150 grams per hour per liter of catalyst and the temperature was maintained at 155° to 160° C. It was found that about two-thirds of the cis-compound was converted to the trans-compound. Moreover, the trans-compound in this product could be removed and the remaining material again recycled over the catalyst to obtain substantially the same degree of isomerization of cis-compound to trans-compound. Thus the reaction products can be recycled a number of times with intermediate removal of the trans-compound to achieve a relatively high yield of the desired product.

It is of course to be understood that the foregoing example is illustrative only and that numerous changes can be made in the materials proportions, and conditions set forth without departing from the spirit of the invention as set forth in the appended claims. Thus the hydrogenation and isomerization steps described above can be used independently of one another. The feed to the isomerization process may be pure cis-2,5-dimethylpyrazine, as well as a reaction product containing this compound. The hydrogenation and isomerization reactions may be carried out sequentially as described in the specific example, using either the same or a different catalyst. Alternatively the two reactions may be carried out simultaneously in the same catalyst bed by continuously mixing with the feed mixture of 2,5-dimethylpyrazine and hydrogen reaction products from which the trans-2,5-dimethylpiperazine has been removed. Other modifications within the scope of the invention will be apparent to those skilled in the art.

We claim:

1. The method of making trans-2,5-dimethylpiperazine which comprises feeding continuously through a nickel catalyst bed wherein reduced nickel is supported on a carrier selected from the group consisting of the oxides of silicon, aluminum and magnesium a gaseous phase mixture containing cis-2,5-dimethylpiperazine to form a reaction product containing trans-2,5-dimethylpiperazine, cooling said reaction product to condense it and separating trans-2,5-dimethylpiperazine therefrom.

2. The method of making trans-2,5-dimethylpiperazine which comprises feeding continuously through a catalyst bed wherein reduced nickel is supported on a carrier selected from the group consisting of the oxides of silicon, aluminum and magnesium at a temperature of 150° to 180° C. a gaseous phase mixture containing cis-2,5-dimethylpiperazine and hydrogen to form a reaction product containing trans-2,5-dimethylpiperazine, cooling said reaction product to condense it and separating said trans-2,5-dimethylpiperazine therefrom by filtration.

3. The method of making trans-2,5-dimethylpiperazine which comprises continuously feeding through a catalyst bed wherein reduced nickel is supported on a carrier selected from the group consisting of the oxides of silicon, aluminum and magnesium a gaseous phase mixture containing 2,5-dimethylpyrazine, cis-2,5-dimethylpiperazine, and hydrogen to form a reaction product containing trans-2,5-dimethylpiperazine, cooling said reaction product to condense it, and separating said trans-2,5-dimethylpiperazine from said reaction product.

4. The method of making trans-2,5-dimethylpiperazine which comprises continuously feeding to a catalyst bed wherein reduced nickel is supported on a carrier selected from the group consisting of the oxides of silicon, aluminum and magnesium at a temperature of 150°–180° C. a gaseous phase mixture containing 2,5-dimethylpyrazine and hydrogen to form a reaction product containing trans-2,5-dimethylpiperazine, cooling said reaction product to condense it, and separating therefrom by filtration said trans-2,5-dimethylpiperazine.

5. The method of making trans-2,5-dimethylpiperazine which comprises continuously passing a mixture of 2,5-dimethylpyrazine vapor and hydrogen through a catalyst bed wherein reduced nickel is supported on a carrier selected from the group consisting of the oxides of silicon, aluminum and magnesium to form a reaction product containing both trans- and cis-2,5-dimethylpiperazine, cooling said reaction product to condense it, separating trans-2,5-dimethylpiperazine from the other reaction products, and re-vaporizing said other reaction products and passing them through a catalyst bed wherein reduced nickel is supported on a carrier selected from the group consisting of the oxides of silicon, aluminum and magnesium to cause at least a portion of the cis-2,5-dimethylpiperazine therein to be isomerized to trans-2,5-dimethylpiperazine.

6. A method according to claim 5 and wherein said two nickel catalysts are the same.

7. A method according to claim 5 and wherein said two nickel catalysts are different.

8. The method of making trans-2,5-dimethylpiperazine which comprises passing a mixture of 2,5-dimethylpyrazine vapors and hydrogen through a catalyst bed wherein reduced nickel is supported on a carrier selected from the group consisting of the oxides of silicon, aluminum and magnesium at a temperature of 150°–180° C. to form a reaction product containing both trans- and cis-2,5-dimethylpiperazine, cooling the reaction product to condense it, separating from said reaction product by filtration the trans-2,5-dimethylpiperazine, and revaporizing and recycling the filtrate to said catalyst bed to improve the yield of trans-2,5-dimethylpiperazine.

9. A method according to claim 8 and wherein the hydrogen feed rate is from 120 to 400 liters per liter of catalyst per hour and the 2,5-dimethylpyrazine feed rate is from 40–600 grams per liter of catalyst per hour.

References Cited in the file of this patent

Godchot et al.: Bull. Soc. Chim. (France), vol. 51, pp. 349–360 (1932).